Figure 1:
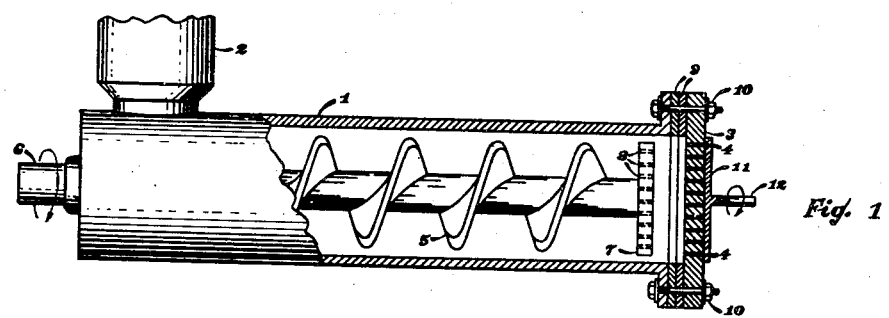

Inventor
William A. LaLande, Jr.

Patented Nov. 15, 1949

2,488,129

UNITED STATES PATENT OFFICE 2,488,129

APPARATUS FOR EXTRUSION OF PLASTIC MATERIALS

William A. La Lande, Jr., Upper Darby, Pa., assignor to Attapulgus Clay Company, Philadelphia, Pa., a corporation of Delaware Application July 1, 1943, Serial No. 493,149

2 Claims. (Cl. 25—14)

The present invention relates to improvements in the extrusion of plastic materials, and more particularly to the production of pellets of uniform size by continuous extrusion.

This invention, although broadly applicable to the extrusion of a variety of materials, is particularly adapted to the continuous production of adsorbents or catalyst pellets of uniform diameter and length, utilizing for the most part conventional extrusion apparatus which may be readily altered to the extent necessary for the practice of this invention.

Attempts have been made heretofore to produce in a continuous manner adsorbent or catalyst pellets utilizing an extrusion machine provided with a stationary, apertured die plate, an auger for continuously forcing the plastic material through the apertures at elevated pressure, and a rotating knife or wire for cutting the extruded material into lengths as it emerges from the apertures of the die plate.

I have found that the extrusion machines available for this purpose have the serious disadvantage of producing pieces of unequal length. This lack of uniformity presents difficulties in the handling, conveying and processing of the adsorbent or catalyst, and particularly in the flow thereof through certain types of apparatus. In processes utilizing moving catalyst beds, such as in the catalytic cracking or dehydrogenation of hydrocarbon oils and gases, the flow of the catalyst is much more uniform and readily controlled when the catalyst pellets are of uniform size. The same is true in the regeneration of the catalysts, where the spent catalysts are passed through a kiln or regenerator in contact with an oxidizing gas at elevated temperature. Furthermore, pellets of uniform size are less subject to attrition or break down during use than are irregular granules of equivalent size. It is therefore highly desirable and advantageous to employ adsorbent or catalyst pellets of uniform size and shape, and to the production of such pellets this invention is primarily directed.

In a conventional auger extrusion machine, the shape of the discharge end or end flight of the auger is such as to cause the plastic material to move from the auger toward the inner face of the die plate with an undulating or pulsating motion, which results in uneven distribution of the material over the die plate and consequent lack of uniformity of rate of extrusion of the material from the plurality of apertures provided in the die plate. In other words, rotation of the auger forces the material through the apertures at unequal rates, depending upon the location of the apertures with respect to the end of the auger. As the end flight of the auger makes it sweep, the material is extruded from the different apertures at different rates, making its appearance at the discharge face of the die plate in the form of a continuously undulating wave comprising a plurality of compact rods of varying lengths, such rods being perpendicular to the die plate. Since these rods are cut off into pellets immediately upon discharge from the outer face of the die plate, it is obvious that the length of the pellets will not be uniform when the rate of extrusion from the die plate apertures is not uniform. I have found that this difficulty may be largely overcome by altering the construction of the auger in a relatively simple and inexpensive manner, as is described more fully hereinafter.

In accordance with my invention, I provide an extrusion machine in which the auger is supplemented with a distributing head preferably mounted upon the auger shaft and rotatable therewith. Such distributing head is spaced from the end flight of the auger, and is likewise spaced from the stationary, apertured die plate normally used in an auger extrusion machine. Depending upon the type of head employed and upon the size, shape, and number of apertures in the die plate, as well as upon the extrusion pressure and rate of throughput desired, it may be necessary to adjust the spacing between the distributing head and the die plate, and means for obtaining this adjustment are provided so that extrusion at a uniform rate may be obtained. Such means may comprise, for example, one or more spacer plates which may be inserted between the discharge end of the extruder barrel and the apertured die plate, or the die plate may be constructed with a shoulder which extends or spaces the die plate the desired distance from the end of the barrel, thus holding the die plate away from the distributing head.

In accordance with my invention, I may utilize various types of distributing heads for the purpose of delivering a uniform supply of plastic material to the apertured die plate, whereby extrusion at a uniform rate may be obtained. The distributing head may comprise a flat, circular plate provided with slots or with a plurality of apertures of desired shape, or a multi-bladed propeller, or a wheel carrying a plurality of vanes. Such distributing head is affixed to the discharge end of the auger shaft and is rotatable with the auger, the head being suitably spaced from the end flight of the auger.

Figure 2:
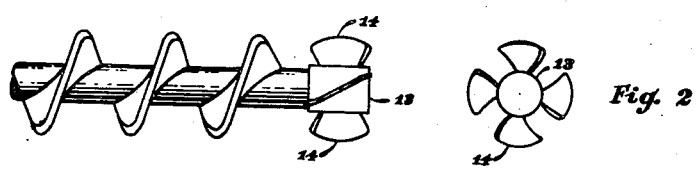
Figure 3:
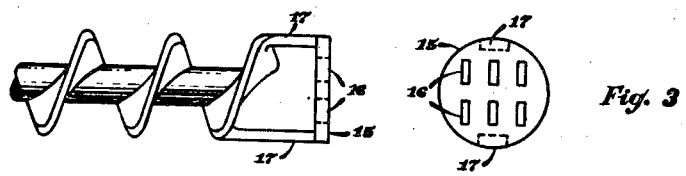
Figure 4:
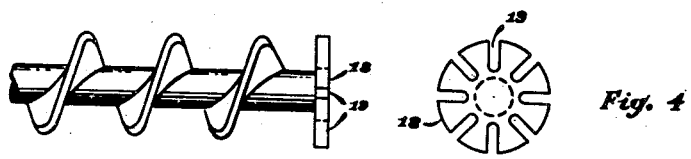

My invention may be further illustrated with reference to the accompanying drawing, in which Figure 1, partly in section, shows an extrusion machine provided with my preferred distributing head and spacer plates, and in which Figures 2, 3, and 4 show various modifications of my distributing head.

Referring to the Figure 1 of the drawing, 1 represents an extrusion machine barrel of circular cross-section provided adjacent one end with a hopper or inlet 2 through which plastic material may be charged to the machine, and at the discharge end with a circular die plate 3 carrying a plurality of apertures 4 of any desired cross-section and size. For the production of adsorbent or catalyst pellets, the apertures may simply be a plurality of circular holes drilled through the die plate, such holes having a diameter of $\frac{1}{16}$ inch to $\frac{3}{8}$ inch. For other purposes, holes of larger diameter may be employed. Within the barrel 1 is provided an auger 5 capable of being rotated by shaft 6 by conventional means not shown. The auger 5 is of such diameter as to ride free within the barrel, the clearance between the auger and the wall of the barrel being, for example, of the order of $\frac{1}{16}$ to $\frac{1}{4}$ inch. Upon the discharge end of the auger is affixed an apertured distributing head 7, which in this case takes the form of a flat, circular plate containing a plurality of holes 8 of uniform diameter. I have found that in order to obtain uniform distribution of the material over the area of the die plate and therefore uniform extrusion from each of the apertures thereof, it is necessary to space the distributing head from the die plate a distance equal to at least one quarter the diameter of the barrel. In other words, for a 2 inch diameter barrel, the distance between the distributing head and the die plate must be at least $\frac{1}{2}$ inch, and for a 14 inch diameter barrel, a distance of at least $3\frac{1}{2}$ inches. Where the ratio of this distance to barrel diameter is less than substantially 1 to 4, the distribution of the material over the inner face of the die plate will not be uniform nor will uniform extrusion be obtained, regardless of the type of distributing head employed. In altering a conventional extrusion machine provided with an auger whose discharge end or end flight is normally within $\frac{1}{2}$ inch to 1 inch of the inner face of the die plate, the end of the auger may be bored out, threaded, and a threaded stud inserted. The distributing head, regardless of type, may then be affixed to the stud, whereby the auger and the head may rotate as one. The distance between the end flight of the auger and the distributing head should be such as to prevent packing of the material between the end of the auger and the head. A distance equal to one half the diameter of the extruder barrel has been found satisfactory, although other distances may be employed depending to some extent upon the design of the head. To obtain the proper spacing between the distributing head and the die plate without recourse to shortening of the auger, one or more spacer plates 9 having an aperture of cross-sectional area equal to that of the barrel 1 may be inserted between the end of the barrel and the die plate 3. Both the spacer plates and the die plate may be rigidly affixed to the end of the barrel by means of bolts 10. While the distance between the distributing head and the die plate should be not less than one fourth the diameter of the barrel, greater distances are not detrimental but fail to serve any useful purpose. In order to cut the extruded material issuing from the plurality of apertures 4 to the desired length, a rotating knife having one or more blades 11 mounted upon shaft 12 is provided adjacent the outer face of die plate 3. Rotation of shaft 12 at desired speed causes the knife blades 11 to sweep the outer face of the die plate, thus cutting the material into lengths as it is uniformly extruded from the apertures 4. Such cutting device is of conventional design and is therefore not described in detail.

In Figures 2, 3, and 4 of the drawing are shown various modifications of distributing heads which may be employed in the practice of my invention. It is to be understood that such modifications are exemplary only, and are not to be construed as limitative, since various minor changes in design or construction may be made without departing from the spirit and scope of my invention.

Figure 2 illustrates a modification using a 4-bladed propeller, comprising a hub 13 carrying the blades 14, such blades being so pitched as to urge the material through the extrusion barrel in the direction of the stationary die plate. The propeller may be integral with the auger shaft or affixed to the end of the auger by means of a suitable stud.

Figure 3 shows an auger carying a flat, circular plate 15 provided with a plurality of rectangular apertures 16, such plate being affixed to the end of the auger by means of a pair of arms or struts 17.

Figure 4 depicts an auger carrying a flat, circular plate 18 provided with a plurality of slots 19 extending radially inward from the periphery of the plate, such plate being affixed to the end of the auger in the manner described with reference to Fig. 2.

The following example is illustrative of an application of my invention in the production of absorbent or catalyst pellets of uniform dimensions by continuous extrusion.

Finely divided acid activated bentonite having a volatile matter content (water) of 20 percent by weight was mixed in a pug mill with sufficient water to bring the volatile content to about 47 percent by weight, in order to render the bentonite plastic and extrudable. While a volatile matter content of about 47 percent by weight is preferred, such content may be varied between 43 percent and 47 percent with satisfactory results. The plastic bentonite was then extruded through an extrusion machine provided with an auger and apertured die plate but no distributing head or means for cutting the extruded bentonite into pellets. This preliminary extrusion was primarily for the purpose of thoroughly incorporating the added water in the acid activated bentonite and thus rendering the bentonite more cohesive and amenable to the formation of tough, dense pellets upon reextrusion. The material thus extruded from the first extruder comprised a plurality of rods which were charged to a second extrusion machine provided with an auger carrying a distributing head, and with an apertured, stationary die plate and a device for cutting the re-extruded material into uniform pellets, such as is illustrated in Figure 1 of the drawing. The once-extruded bentonite was forced by the auger, at elevated pressure, through the apertured distributing head and thence through the apertured die plate. In passing through the distributing head properly spaced with respect to the end flight of the auger and the die plate, the undulating motion of the bentonite discharged from the end of the auger was dampened or smoothed out, with the result that an even distribution of the material was obtained over the whole inner face of the die plate, and the bentonite was extruded through the apertures thereof at a uniform rate. The apertures in this case, had a diameter of 3/16 inch and the cutting device for severing the extruded rods was operated at such speed as to cut the extruded material into pellets having a length of 3/16 inch. The extruded material comprising tough, dense pellets of acid activated bentonite of uniform length and containing approximately 45 percent by weight of water was then dried by heating at a temperature not in excess of about 400 F. for a sufficient period of time to reduce the volatile matter or water content to the desired value, for example, 20 percent by weight. The dried pellets were then in condition for use as an adsorbent or catalyst.

While, herein, I have described my invention particularly with respect to its application in the production of uniform pellets of acid activated bentonite, my invention is adapted broadly to the extrusion and pelleting of a variety of materials, including fuller's earth, bentonite, bauxite, silica-alumina mixtures or complexes, synthetic calcium, magnesium, and aluminum silicates, or mixtures of two or more thereof. In the extrusion of these argillaceous materials, the volatile matter or water content must be adjusted to a value between 30 percent and 65 percent depending upon the nature of the material and the conditions under which it is desired to extrude same. Such argillaceous materials may carry or be impregnated with various compounds, and particularly the oxides and sulfides of the metals which may function to catalyze various reactions. The pelleted materials produced in accordance with my invention may be employed in the refining of hydrocarbon oils and gases, in the conversion of hydrocarbon oils and gases into motor fuel, in the hydrogenation or dehydrogenation of hydrocarbons, and in various other processes where catalysis is desirable.

Herein, and in the appended claims, the term "apertured distributing head" is to be understood to comprehend any of the types described and illustrated or modifications of such types, including plates provided with apertures of the same or different size or shape, plates provided with slots extending inwardly from the periphery thereof, propellers comprising one or more blades of the same or different size, shape or pitch, or a combination of two or more of the same or different types of heads.

I claim:

1. In an extrusion machine provided with a stationary die plate containing a plurality of apertures, means for effecting continuous extrusion of a plastic material at a uniform rate through the apertures of said stationary die plate, comprising an auger and a circular, apertured plate affixed thereto, said apertured plate being spaced from said stationary die plate.

2. In an extrusion machine provided with a stationary die plate containing a plurality of apertures, means for effecting continuous extrusion of a plastic material at a uniform rate through the apertures of said stationary die plate, comprising an auger and a circular, slotted plate affixed thereto, said slotted plate being spaced from said stationary die plate.

WILLIAM A. LA LANDE, JR.

REFERENCES CITED

The following references are of record in the file of this patent:

UNITED STATES PATENTS

| Number | Name | Date |
| --- | --- | --- |
| 855,379 | Bangs | May 28, 1907 |
| 1,595,470 | Johnson | Aug. 10, 1926 |
| 2,032,624 | Lyons | Mar. 3, 1936 |
| 2,269,436 | Christopher | Jan. 13, 1942 |
| 2,336,734 | Jellinek | Dec. 14, 1943 |
| 2,344,959 | Avery | Mar. 28, 1944 |
| 2,391,050 | Horn | Dec. 18, 1945 |